United States Patent

Beal et al.

[11] 3,732,041
[45] May 8, 1973

[54] POWER TRANSMISSION

[75] Inventors: Thomas E. Beal, Rochester; John W. Curnow, Utica, both of Mich.

[73] Assignee: Sperry Rand Corporation, Troy, Mich.

[22] Filed: June 10, 1971

[21] Appl. No.: 151,680

[52] U.S. Cl....................................417/222, 91/506
[51] Int. Cl.................................................F04b 1/26
[58] Field of Search......................91/506, 459, 434; 417/222

[56] References Cited

UNITED STATES PATENTS

| | | | |
|---|---|---|---|
| 3,252,419 | 5/1966 | Tyler | 417/222 |
| 3,286,601 | 11/1966 | Jones | 91/459 |

*Primary Examiner*—William L. Freeh
*Assistant Examiner*—G. LaPointe
*Attorney*—Theodore Van Meter

[57] ABSTRACT

A pump for use in a hydraulic power transmission system has a servomotor for varying its displacement which is controlled by a valve responsive to delivery line pressure of the pump. The valve, in turn, is controlled both by a spring which determines a minimum level of delivery pressure and by a piston responsive to the pressure level in a bleed circuit. The bleed circuit includes a fixed restriction and an electrically modulated flapper valve so that the pressure level in the pump delivery line may be modulated by adjustment of the current flowing through the coil of the electrically modulated flapper valve.

2 Claims, 1 Drawing Figure

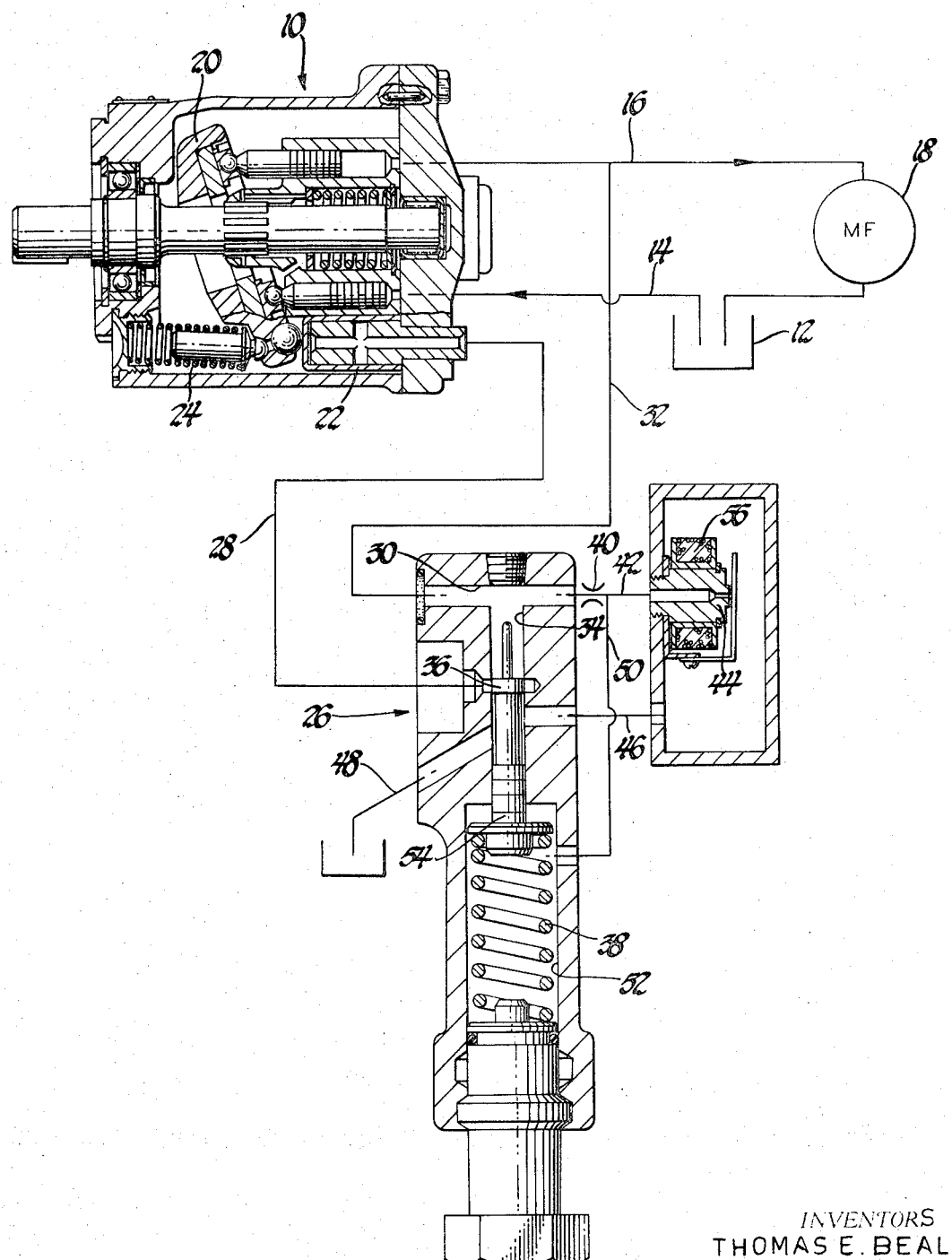

POWER TRANSMISSION

In the application of variable displacement pumps to use in power transmission systems, it is common to provide automatic controls which so regulate the pump displacement as to produce a particular pressure level in the pump delivery line so as to accommodate random variations in the momentary volumetric requirements for fluid delivery demanded by the fluid utilization portion of the power transmission system. A common type of control for this purpose senses the pressure level in the delivery line and applies this through a piston to a control spring which may either act directly or through a servomotor and control valve upon the displacement controlling member of the pump. Any change in the pressure level which it is desired to maintain in the pump delivery line is then made by adjusting the force of the spring. There are many applications where the ability to remotely and quickly change the pressure level at which the automatic control response is necessary. For this purpose, it has been customary to arrange for remote operation of the spring adjustment through some sort of follow-up transmission system. The complexity of such systems and the difficulty of obtaining precise repeatability in adjusting the force level of the spring have been the principal drawbacks in the utilization of such systems.

The present invention aims to overcome these drawbacks by the provision of an electrically modulated hydraulic pump having a servomotor arranged to vary the pump displacement, a control valve connected to inject or withdraw pressure fluid into or out of the servomotor, means connected to operate the valve to modulate the delivery pressure of the pump comprising a sensing piston and cylinder connected to the delivery side of the pump, a spring opposing the sensing piston and cylinder, a second sensing piston and cylinder opposing the first one, and electrically operated means for supplying fluid to the second piston and cylinder at any selected pressure level below the delivery pressure of the pump.

IN THE DRAWING

The single FIGURE represents diagrammatically a pump and control system incorporating a preferred form of the present invention.

Referring now to the drawing, 10 represents a pump of the variable displacement type which may be connected to withdraw fluid from a reservoir 12 through an inlet conduit 14 and deliver the fluid through a delivery line 16 to a hydraulic motor 18, which exhausts to the reservoir. The pump 10 has a displacement varying member 20 in the form of a swashplate which is under the control of a servomotor 22 opposed by a spring 24. The components thus illustrated and described are representative of a wide variety of components with which the present invention may be utilized.

For the purpose of controlling the servomotor 22, a control valve 26 is provided and may be attached directly to the body of the pump 10 to communicate directly with the servomotor 22. This communication is indicated diagrammatically at 28. Valve 26 has a passage 30 connected by the line 32 with the delivery line 16 and intersecting a valve bore 34. Thus, there is formed a cylinder within which a valve spool 36 may slide and the upper end of the spool may constitute a sensing piston exposed to delivery line pressure. The lower end of the spool 36 abuts a spring 38 which opposes the force of the sensing piston. The spring 38 may exert a relatively light force so that valve 36, when uninfluenced by other factors, will be held closed only when delivery line pressure is below a certain low minimum value.

For the purpose of modulating the delivery line pressure from a remote point and causing it to be maintained at any desired level above the minimum, a bleed circuit is provided consisting of a fixed restrictor 40, a duct 42, an electromagnetic flapper valve 44, a duct 46 leading to the valve bore 34 and an exhaust line 48. This bleeds off a continuous small flow from the delivery line 16. From a point in the duct 42 between the restrictor 40 and the flapper valve 44, a branch 50 connects to the spring chamber 52. The pressure in this chamber is exerted upon a sensing piston 54, tending to move the valve 36 upwardly and, in effect, adding to the force exerted by the spring 38.

The degree of opening of the flapper valve 44 is controlled by varying the current supplied to the electromagnetic coil 56. Increasing the current in coil 56 tends to create a higher restriction in the flapper valve 44 and thus raise the pressure in duct 42 and branch 50. This, for example, will in effect, add to the force being exerted by spring 38 and valve 36 will then only find its equilibrium closed position when the swashplate 20 is so adjusted that the pressure in delivery line 16 is maintained at the new higher value. Thus, by changing the level of electric current supply to the coil 56, the pressure against which the pump 10 delivers fluid into delivery line 16 may be set at any level desired. The control valve 36 will then either feed into or withdraw out of the servomotor 22 the appropriate quantity of fluid to bring the pump's delivery rate to a value where the new pressure level is maintained.

We claim:

1. An electrically modulated hydraulic pump having a servomotor arranged to vary the pump displacement, a control valve connected to inject or withdraw pressure fluid into or out of the servomotor, means connected to operate the valve to modulate the delivery pressure of the pump comprising a sensing piston and cylinder connected to the delivery side of the pump, a spring opposing the sensing piston and cylinder, a second sensing piston and cylinder opposing the first one, and electrically operated means for supplying fluid to the second piston and cylinder at any selected pressure level below the delivery pressure of the pump, said electrically operated means comprising an electromagnet and a flapper valve responsive to the current supplied to the electromagnet, duct means for bleeding a small flow of pressure fluid from the pump delivery through the flapper valve and a fixed restriction in the duct means in series with the flapper valve.

2. A pump as defined in claim 1 wherein the restriction is upstream of the flapper valve and a branch passage is connected from ahead of the flapper valve to the second sensing piston and cylinder.

* * * * *